NONISOTROPICALLY ELECTRICALLY CONDUCTIVE ELECTRODES

Filed Aug. 8, 1967 3 Sheets-Sheet 1

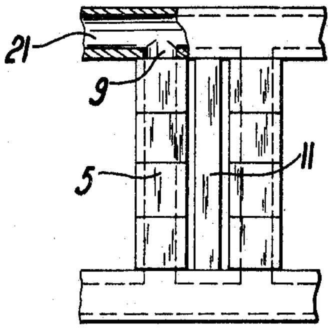
FIG. 4
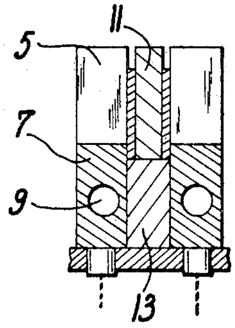
FIG. 5
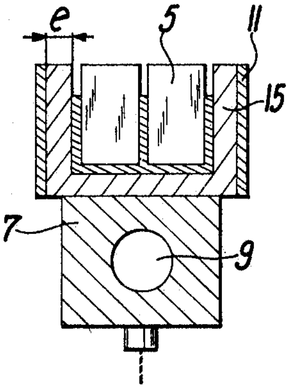
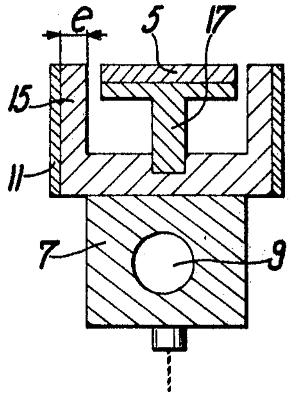
FIG. 6 FIG. 7

NONISOTROPICALLY ELECTRICALLY CONDUCTIVE ELECTRODES

Filed Aug. 8, 1967 3 Sheets-Sheet 3

United States Patent Office 3,487,256
Patented Dec. 30, 1969

3,487,256
NONISOTROPICALLY ELECTRICALLY CONDUCTIVE ELECTRODES

Andre Dubois, Orsay, and Joseph Sadoune, Antony, France, assignors to Commissariat a l'Energie Atomique and Electricite de France, Paris, France
Filed Aug. 8, 1967, Ser. No. 659,080
Claims priority, application France, Aug. 16, 1966, 73,195
Int. Cl. H01j 1/14
U.S. Cl. 313—346 3 Claims

ABSTRACT OF THE DISCLOSURE

Nonisotropically electrically conductive electrodes, have bars of emissive ceramic material, brazed onto a cooled support. The spaces between the supports are filled with a continuous block of insulating plastics material, suitable ducts being provided in this block for circulation of a thermally conductive fluid.

The invention relates to nonisotropically electrically conductive electrodes, as used more particularly in magnetohydrodynamic generators, in which gases flow.

The invention relates more particularly to electrodes of this type which are constituted by bars of ceramic material, more particularly zirconium dioxide based material, brazed onto a cooled support, more particularly a copper support.

It is well known that in magnetohydrodynamic generators whose Hall effect coefficient is considerably above unity, there is a large electric field component parallel to the direction of movement of the gases. It is also well known that for good operation of the generator it is essential for the conductive walls to be divided into a large number of elements which are respectively cathodes and anodes.

The main object of the invention is to make such electrodes better able than before to meet the various requirements of practice, more particularly providing walls with a high electrical conductivity in a direction parallel to the movement of the gases and high resistance in the direction at right angles to said movement, high resistance to thermal shock, efficient operation with no short-circuiting between electrodes, and a possibility of making the walls with large dimensions and in the form of curved trapezoids.

According to the invention, each electrode is constituted by bars of emissive ceramic material, more particularly zirconium dioxide based material, brazed onto a cooled support, more particularly a copper support, and insulated by a layer of lime zirconate also brazed on this support, and the spaces between the supports are filled with a continuous block of insulating plastics material, more particularly polymerised in situ, suitable ducts being provided in this block for circulation of a thermally conductive fluid.

In preferred embodiments of the ivention the circulation of the thermally conductive fluid may be parallel or perpendicular to the flow of plasma in the generator. Preferably the temperature of the cooled support is below 1000° C., and the supoprt is precision-machined according to the bar temperature desired.

The invention will be better understood from the following description and the accompanying drawings, which are given by way of example only.

In the accompanying drawings:

FIG. 4 is a top view of an alternative embodiment of this wall;

FIG. 5 is a section along the plane $xz$ (FIG. 1) showing the wall in FIG. 4;

FIG. 6 is a section along the plane $xz$ (FIG. 1) of one embodiment of an elementary electrode;

FIG. 7 is a section along the plane $xz$ (FIG. 1) of an alternative embodiment of elementary electrode;

Figure 1:
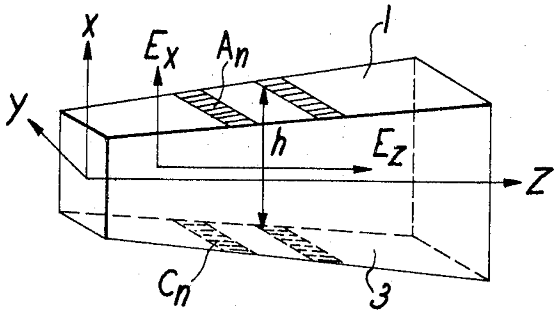
FIG. 1 is a diagrammatic view of a magnetohydrodynamic generator.

FIG. 1 shows diagrammatically a magnethydrodynamic generator in which the gases move in the direction of an axis $x$ between two conductive walls 1, 3. These gases are subjected to a magnetic field directed parallel to an axis $z$ and to an electric field having components $Ex$ and $Ez$, the component $Ez$ being relatively large. In order to produce this electric field, the wall 1 is divided into a large number of elementary anodes $A_n$ and the wall 3 into a large number of elementary cathodes $C_n$.

The object of the invention is to provide a wall such as 3 which for example had high electrical conductivity in the direction $Ex$ and a high resistance in the direction $Ez$.

This object is attained, while ensuring a long wall life, by using narrow bands of a composite material which is electrically conductive when it is hot, the bands being arranged perpendicular to the direction of gas flow and alternating with bands of lime zirconate, preferably stoichiometric, to act as insulating material.

Figure 2:
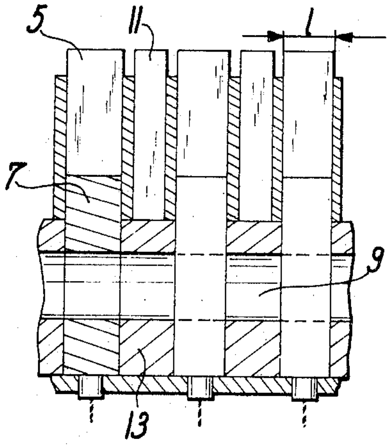
FIG. 2 is a section along a plane $xz$ (FIG. 1) of one form of generator wall 3 embodying the invention.
Figure 3:
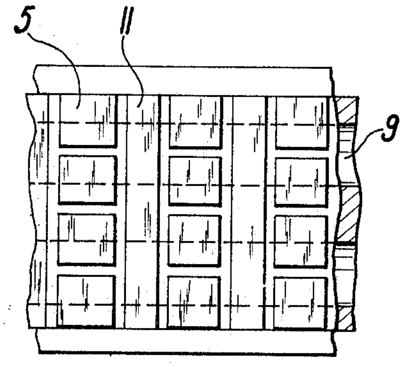
FIG. 3 is a top view of the wall in FIG. 2.

FIGS. 2 and 3 show a generator wall 3 embodying the invention.

This wall has a series of bars 5 made of a ceramic which is thermionically emissive and conductive, for example zirconium dioxide enriched with lime or with a material with a low work function. The bars 5, which are first plated by spraying on a metal, are brazed onto a copper support 7 cooled by a flow of deionised water or of oil in ducts 9. Strips 11 of stoichiometric lime zirconate separate the bars 5 and provide electrical insulation in the direction of movement of the gases. The strips 11 are themselves brazed onto the copper supports 7 and onto the bars 5; a fitting 13 made of synthetic resin with a silica or alumina filler ensures cohesion of the whole and a continuous passage for the coolant.

The advantages of this embodiment include the following:

(1) It is easy to break up the electrodes effectively since the width of the bars 5 can be two or three millimetres, and the ratio of their width $l$ to the height $h$ of the duct (FIG. 1) may be a few hundredths.

(2) Since the electrodes are thoroughly broken up, and since the materials used in the hot zone have very similar expansion coefficients, the electrodes have a high resistance to thermal shock.

(3) The dimensions of the generator faces may be large even if they are in the form of curved trapezoids.

(4) Since there are intervals between the bars 5 because of the strips 11, the electrodes operate without short-circuiting each other.

In the following figures like reference numerals are used for materials having like functions.

FIGS. 4 and 5 show an alternative embodiment in which the cooling ducts 9 are perpendicular to the direction of flow of the gases in the generator.

FIG. 6 shows an embodiment of an elementary electrode in which the insulation resistance of the lime zirconate is increased by keeping it at a relatively low temperature (500 to 600° C.) by means of a metal support 15 with a similar expansion coefficient (monel or titanium) in good thermal contact with the water-cooled copper member 7. The deposit 11 of stoichiometric lime zirconate is then formed with a plasma torch and is about 1 mm. thick. The support 15 also provides a cooled zone in the gas which results in an insulation resistance between the electrodes. Its dimension *e* can be adjusted as desired.

FIG. 7 shows an alternative embodiment of an elementary electrode. The metal support 15 is of the same kind as that in FIG. 6 and is selected as already indicated. A member 17 is provided to bring the current at a high enough temperature for the strip 5—whose role is the same as that of bars 5—to be conductive. As before, the dimension *e* is adjustable, so that the disconnection between the electrodes can be varied.

Figure 8:
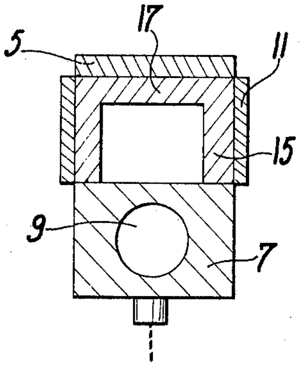
FIG. 8 is a section along the plane $xz$ (FIG. 1) of another alternative embodiment of an elementary electrode.

FIG. 8 shows another alternative embodiment of an elementary electrode in which the functions of the members 15 and 17 are combined. This simplification is at the cost of an increase in the temperature of the layer 11 and therefore a slight decrease in the insulation between two elementary electrodes.

Figure 9:
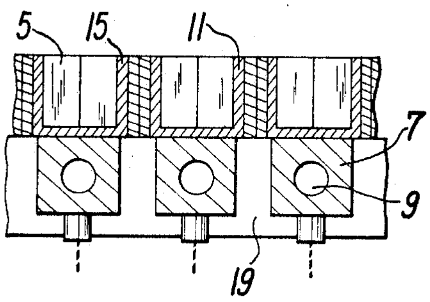
FIG. 9 is a section along the plane $xz$ (FIG. 1) showing a generator wall made from elementary electrodes as in FIG. 6.
Figure 10:
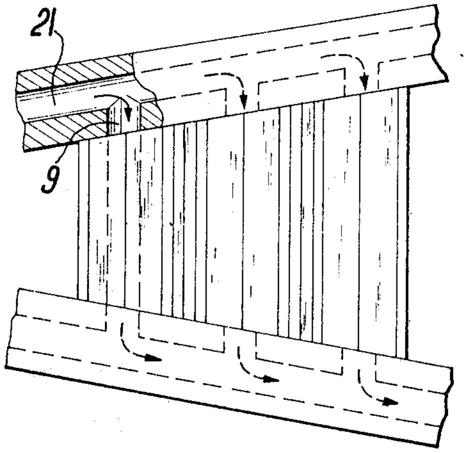
FIG. 10 is a top view of the wall in FIG. 9.

FIGS. 9 and 10 show a generator wall formed by assembling electrodes as shown in FIG. 6, using a polymerisable, insulating plastics material 19. Ducts 21 in this material bring the thermally conductive fluid to the ducts 9.

We claim:

1. Nonisotropically electrically conductive electrodes for magnetohydrodynamic generators, in which gases flow, each electrode comprising bars of emissive ceramic zirconium dioxide based material, a cooled copper support for said bars, said bars being brazed thereon and insulated from each other by a layer of lime zirconate also brazed on said support, spaces between said supports, said spaces being filled with a continuous block of insulating plastics material polymerised in situ, and ducts in said block for circulation of a thermally conductive fluid.

2. Electrodes as claimed in claim 1, the circulation of the thermally conductive fluid being perpendicular to the flow of plasma in the generator.

3. Electrodes as claimed in claim 1, the temperature of the cooled support being below 1000° C.

References Cited

UNITED STATES PATENTS

| | | | |
|---|---|---|---|
| 3,135,208 | 6/1964 | Stuetzer | 310—11 |
| 3,149,247 | 9/1964 | Cobine et al. | 313—346 X |
| 3,183,380 | 5/1965 | Hurwitz et al. | 310—11 |
| 3,275,860 | 9/1966 | Way | 310—11 |
| 3,274,408 | 9/1966 | Louis | 313—346 |
| 3,280,349 | 10/1966 | Brenner et al. | 310—11 |
| 3,311,762 | 3/1967 | Croitoru | 313—346 X |
| 3,397,331 | 8/1968 | Burkhard | 313—311 X |
| 3,406,300 | 10/1968 | Teno et al. | 313—346 |

JOHN W. HUCKERT, Primary Examiner

ANDREW J. JAMES, Assistant Examiner

U.S. Cl. X.R.

310—11; 313—311